Dec. 12, 1944.　　A. E. RIDEOUT ET AL　　2,365,007
CAN HANDLING MACHINE
Filed April 27, 1942　　5 Sheets-Sheet 5

INVENTORS
Arthur E. Rideout
Malcolm Mc. Faull
Ludwig Wimmer
BY Pennie, Davis, Marvin and Edmonds
THEIR ATTORNEYS Patented Dec. 12, 1944

2,365,007

UNITED STATES PATENT OFFICE 2,365,007

CAN-HANDLING MACHINE

Arthur E. Rideout, Chicago, Ill., Malcolm McFaull, Jackson Heights, N. Y., and Ludwig Wimmer, Middletown, Conn., assignors to Standard-Knapp Corporation, Portland, Conn., a corporation of New York Application April 27, 1942, Serial No. 440,637

10 Claims. (Cl. 214—1.1)

This invention relates to machines for handling cans, particularly in facilitating their arrangement for delivery to labeling machines.

In the salmon and other fish-canning industries and in plants where other food products such as fruit, vegetables, etc., are packed in cans, the cans, after filling and closing, are usually processed in apparatus by which their contents is subjected to a cooking operation, for example, by submergence of the cans in a boiling liquid. According to a method of handling such cans which is in considerable favor, the cans are placed in upright position in large metal trays holding usually a hundred or more cans.

After the processing is finished, the cans go to the labeling machine which places a label on each can individually. The cans thus have to be taken out of the trays and arranged in a single line. This is done by means of a rotary converging disk to which the cans are fed by a conveyor after they are removed from the tray.

A simple way of removing the cans from the trays is to invert the trays of cans and then lift off the trays, and the apparatus of the present invention receives the loaded trays one at a time and inverts them and then advances the cans along a conveyor to the converging disk.

On account of the high speed operation of the processing apparatus and particularly of the can labeling apparatus which is capable of placing the labels on the cans at a rate as high as 1,000 cans per minute, it is something of a problem to invert and remove the trays quickly enough to keep up with such a rate of production, and the object of the invention is to provide an improved inverting apparatus which will handle a load of several hundred pounds and still accomplish the inverting operation quickly and with little effort or power consumption.

An object of the invention also is to provide a can tray inverting apparatus which is convenient to operate and which is of rugged construction and will remain in service for long periods of time without much attention.

Another object of the invention is to provide a can tray inverting apparatus which is safe to operate both from the standpoint of the person operating it and from that of the cans being handled so as to prevent denting or breakage.

The invention will be understood from a study of the accompanying drawings which illustrate by way of example one embodiment of the invention.

Figure 1:
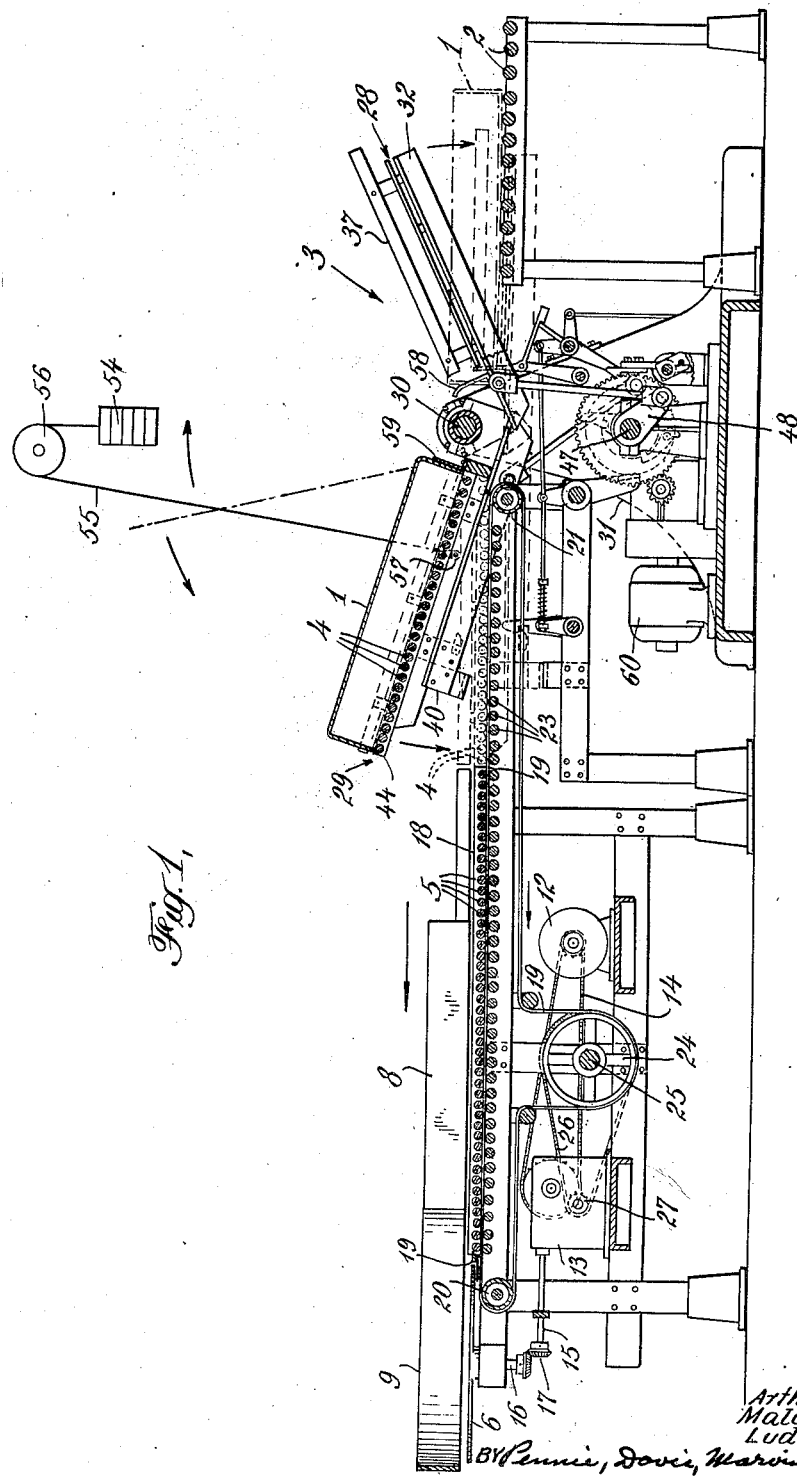
Fig. 1 is a longitudinal vertical section of the improved tray-inverting apparatus arranged to receive the trays of cans from a conveyor and deliver the cans after inverting to another conveyor by which they are carried to the converging disk, the parts of the inverting apparatus being shown in their position just prior to the delivery of an inverted tray.
Figure 2:
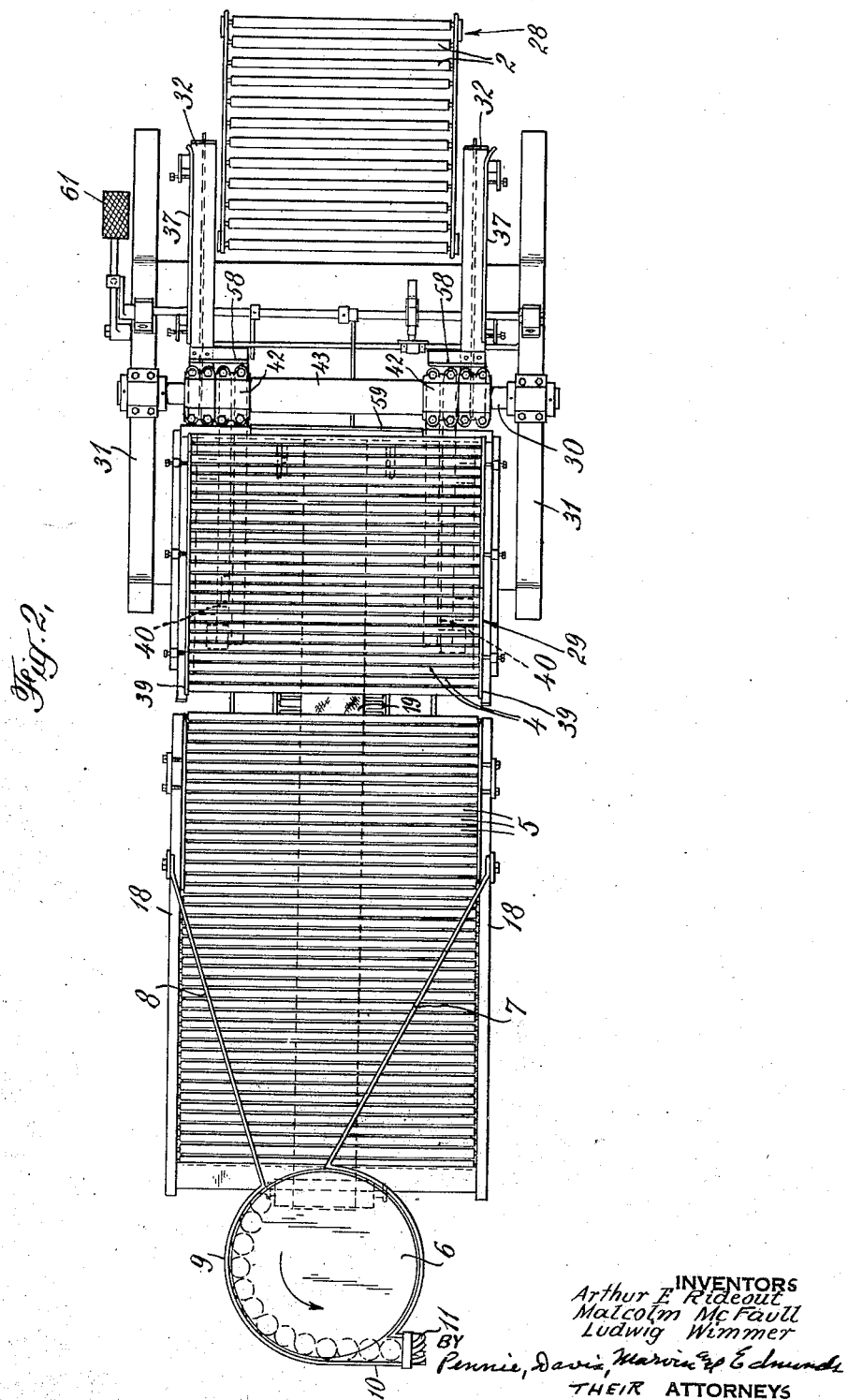
Fig. 2 is a plan view of the apparatus shown in Fig. 1.
Figure 3:
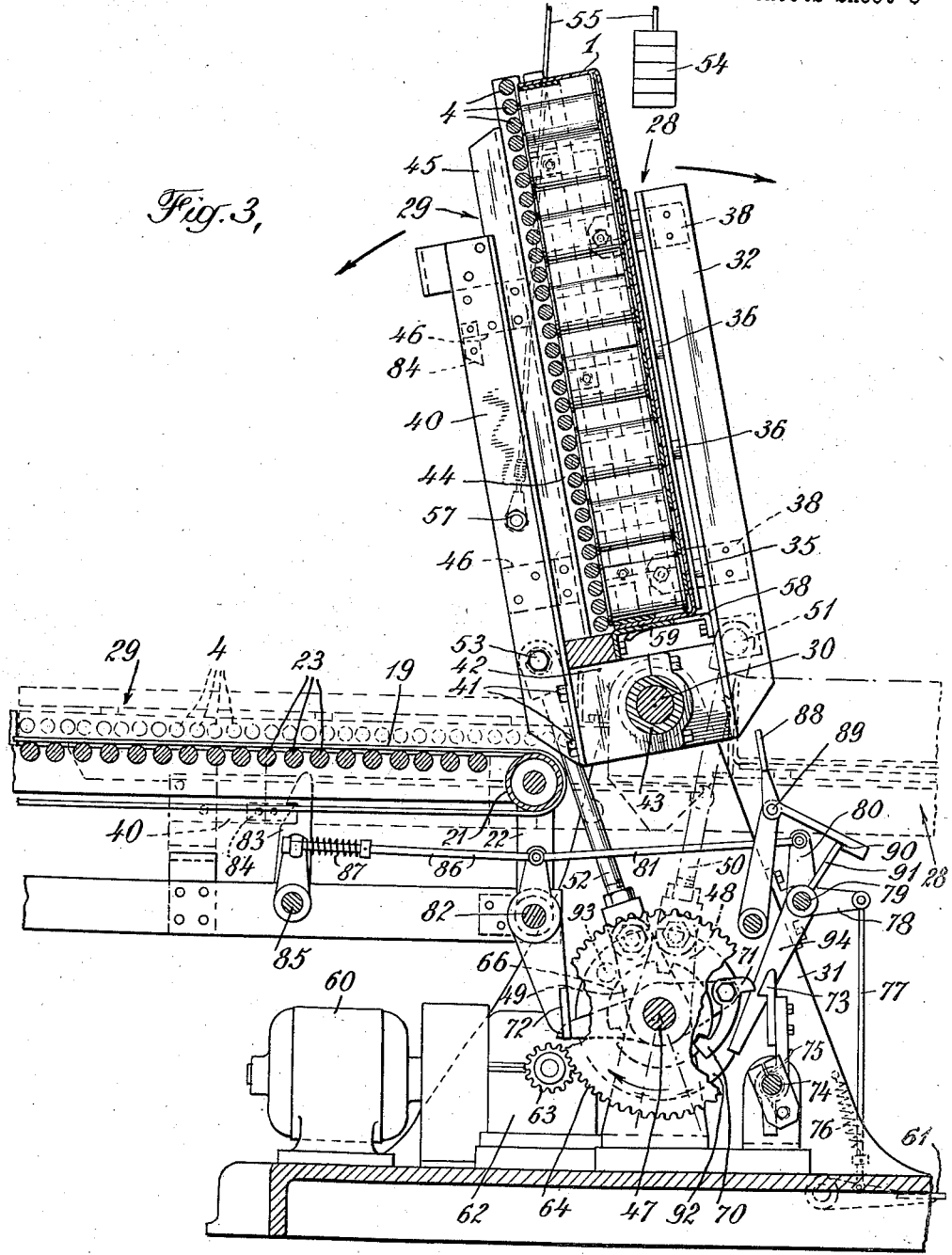
Fig. 3 is an enlarged vertical longitudinal section of the inverting apparatus with its parts shown at the midstroke of its operating mechanism and illustrating also the mechanism for controlling their operation.
Figure 8:
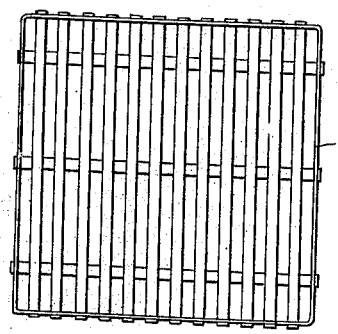
Fig. 8 is a top view of an empty tray.

Referring now to the accompanying drawings, the progress of the cans is from right to left in Figs. 1, 2 and 3. The can trays indicated by numeral 1 (Figs. 8, 1, 3 and 4) are constructed of heavy metal bars as shown in Fig. 8, which are secured together in spaced relation at right angles to one another by welding or riveting. These bars are bent at the sides and ends of the tray to form side and end walls which extend nearly to the tops of the cans. These trays are preferably square or rectangular in shape and may be of any desired size, but preferably hold from about 100 to 200 one pound cans standing upright on the bottom of the tray but in random arrangement, that is to say, not being arranged in rows.

The trays filled with cans, after leaving the last processing operation, are advanced along a roller conveyor to the end of this conveyor adjacent the inverting apparatus which is indicated generally by numeral 3 and which is arranged to receive and remove the trays from conveyor 2. The trays of cans are inverted by the apparatus 3 which turns the cans upside down leaving the tray resting on the top of the mass of cans as shown in Fig. 1. The inverting apparatus is provided with a roller conveyor section 4 on which the cans rest and which at the completion of the inverting movement becomes a live roller conveyor. As soon as the inverting operation is finished the cans begin to move out of the inverting apparatus onto a live roller conveyor 5 by which the cans are advanced and delivered to the converging disk 6, being guided thereto by converging side guides 7 and 8. Hence no time is lost between the completion of the inverting operation and the continuation of the forward movement of the cans toward the converging disk. The inverted tray 1 is lifted off the cans as soon as the inverting movement is completed and while the cans are moving forward toward or onto conveyor 5. This is done preferably by two operators, one standing on each side of the apparatus.

The conveyor 2 at the intake or receiving end of the inverting apparatus 3 may be either a hand or a power conveyor. It may be inclined so that the trays move along it by gravity or it may be provided with power driven or live rollers, or a belt conveyor may be used if desired. Also the trays may be deposited on the conveyor section 2 shown in Fig. 1 by means of a traveling crane or other suitable apparatus for carrying the loaded trays of cans. In such event, conveyor section 2 would be employed merely as a table or support for the load of trays from which they are taken by the inverting apparatus.

It will be understood that the cans on the converging disk 6 arrange themselves in a single row around the periphery of the disk on which they are held by means of circular side wall 9 surrounding the disk and that the cans in this row pass through an opening in the side wall 9 onto a single line conveyor 10. The cans may, if desired, be carried forward in upright position to the labeling machine, or if desired they may be sent through a twister 11 by which they are turned at right angles and laid on their sides permitting the use of an inclined gravity conveyor line along which the cans roll to the labeling machine when a labeling machine of the horizontal type is employed.

The converging disk 6 is rotated at the proper speed to provide the desired centrifugal action and both this disk and the live rollers of conveyor 5 and conveyor section 4 of the inverting apparatus are driven from a single electric motor 12 through a reduction gearing 13 to which the motor is connected by means of a belt 14. The converging disk 6 is driven from a slow speed shaft 15 which extends from the rear end of the reduction gear box 13, this shaft being connected with shaft 16 of the converging disk 6 by the beveled gearing 17.

The rollers of the live roller conveyor 5 are individually mounted for rotation and supported in two side bars which extend along each side of the conveyor as shown in Figs. 2 and 1. These rollers are positively driven by means of an endless belt 19 which engages the lower surfaces of rollers 5 and consequently moves from left to right as shown in Figs. 1 and 2. In the embodiment of the invention illustrated, this one belt is used to drive the live rollers 4 of the inverting apparatus as well as the live rollers 5 of the conveyor. Consequently belt 19 is supported at its left hand end by a pulley or drum 20 adjacent the converging disk 6 and at its right hand end by a similar pulley or drum 21 which is mounted for rotation on a shaft which is supported by upright frame members 22 located near the center of the inverting apparatus.

Belt 19 is not as wide as the rollers 4 and 5, but is only of sufficient width to provide a proper frictional driving surface with these rollers. Belt 19 is maintained in frictional engagement with the lower surfaces of rollers 4 and 5 by a series of short rollers 23 (see Fig. 6) suitably journaled in the frames of the inverting apparatus and the roller conveyor section 5.

Belt 19 is driven from a large pulley 24 (Fig. 1) journaled on a cross shaft 25 and this shaft is rotated by a chain 26 which passes around a sprocket on shaft 25 and is driven from a sprocket 27 on one of the slow speed shafts of reduction gearing 13.

Figure 4:
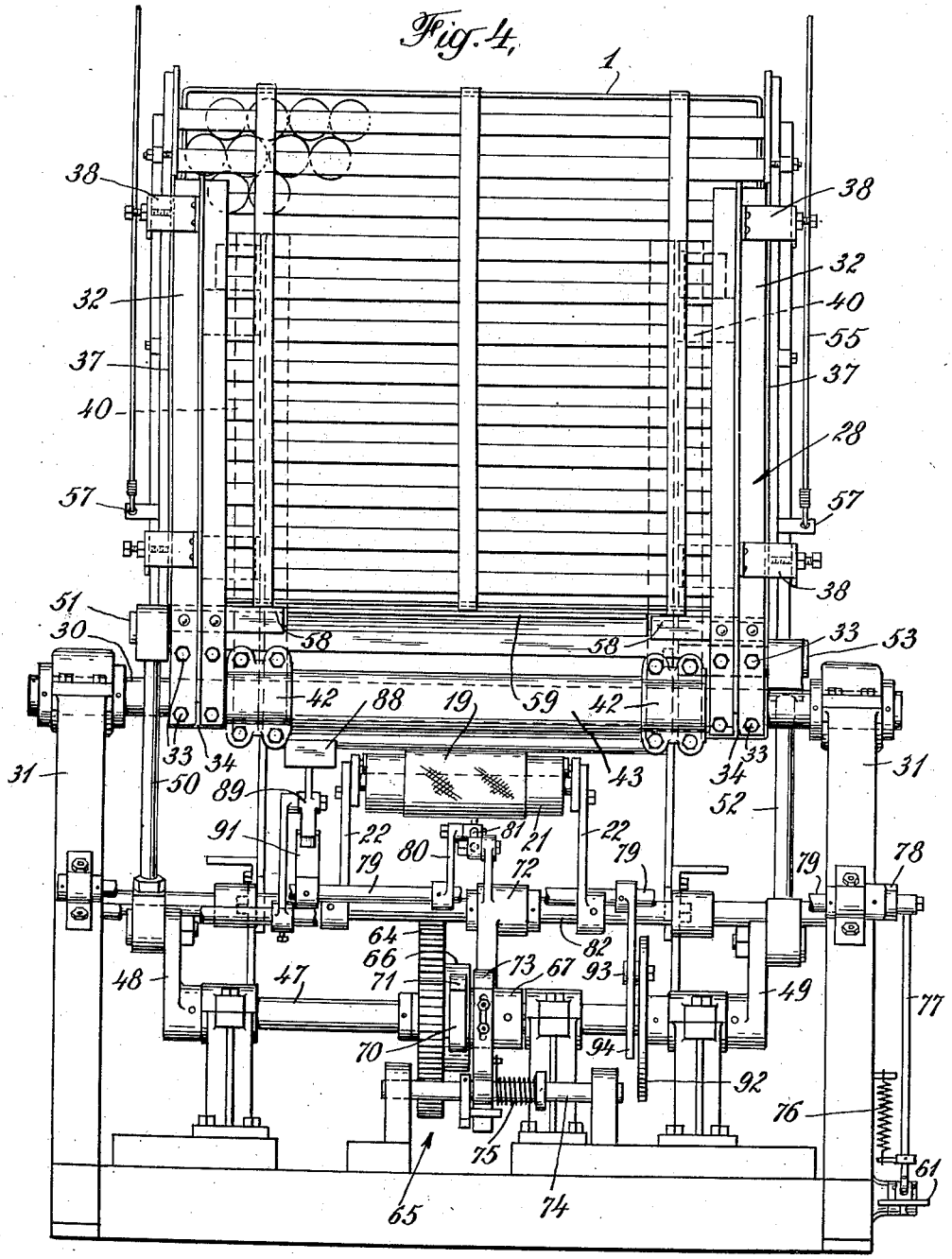
Fig. 4 is a view in elevation drawn to the same scale as Fig. 3 and showing the apparatus in the position of Fig. 3 as viewed from the right or intake side.

Referring to Figs. 1 and 3, the tray-inverting apparatus 3 comprises a tray-supporting frame indicated generally by numeral 28 and a can-receiving member indicated generally by numeral 29 hinged together along one margin on a transverse shaft 30 which is supported for turning movement at the top of two A-shaped frame members 31, one on each side of the machine (Fig. 4). These two members, the tray supporting frame 28 and the can-receiving member 29, are arranged to swing about the center of shaft 30 by mechanism presently to be described which includes counterbalancing means by which the weight of the parts and the loaded tray are at least partially counterbalanced through substantially their entire movement.

Tray-supporting member 28 and can-receiving member 29 move in unison swinging simultaneously on their common axis from a position where the two members are substantially in alinement with one another and with the two conveyors 2 and 5, respectively, as shown in dotted lines in Fig. 1, in which position a loaded tray is advanced on conveyor 2 into a position to be lifted by the tray-supporting frame 28. The two members 28 and 29 swing from the open or unfolded position just described to the closed or folded position shown in Fig. 3 where the loaded tray is enclosed between them and tilted toward the can-receiving member 29. The tray-supporting member 28 swings beyond the vertical and the can-receiving member swings upwardly at least to meet the cans in the tray and serve as a sort of cover for the tray to prevent the cans from spilling out. Having reached the folded position of Fig. 3, members 28 and 29 immediately commence to swing back in opposite directions, the cans and tray being transferred from the tray-supporting member 28 to the can-receiving member 29. Members 28 and 29 continue this movement to their original unfolded position in alinement with the two conveyors or tables 2 and 5, the cans and tray being carried during this movement into completely inverted position with the tray resting on top of the cans, as shown in full lines in Fig. 1, in which the members 28 and 29 are moving downwardly approaching the unfolded position.

The tray-supporting frame 28 comprises two arms 32 which are fixed in spaced relation to one another in the same plane on shaft 30. These arms 32 consist of T-members each secured by bolts 33 (Fig. 4) to bracket members 34 which are keyed and clamped securely to shaft 30. Arms 32 are located one on each side of conveyor 2 so as to lift the opposite side margins of the tray. Tray-engaging plates 35 are mounted on the upper faces of each of the arms 32 by suitable bolts and spacing blocks 36. By replacing these spacing blocks with thicker or thinner ones, the location of plates 35 can be adjusted with respect to arms 32 to accommodate cans of different height.

Figure 5:
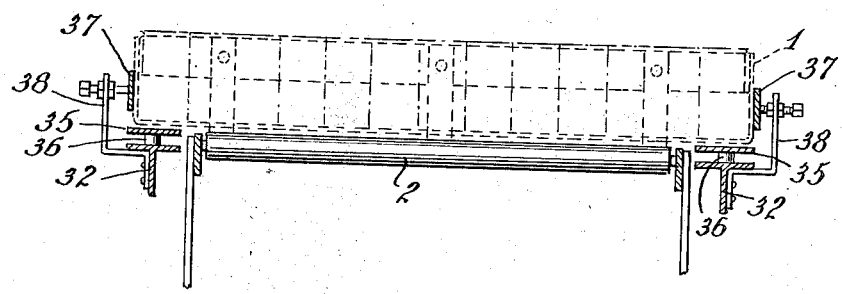
Fig. 5 is a transverse vertical section of the receiving side of the inverting apparatus with a tray of cans received therein before the commencement of the inverting operation.

Side guides 37 secured by means of brackets 38 to arms 32 engage the sides of the trays to hold them in a fixed predetermined position so as to deliver the inverted cans properly between somewhat similar guides 39 on can-receiving member 29 when the transfer of the cans from the tray-supporting frame 28 to can-receiving member 29 takes place at the folded position of these members. Side guides 37 are adjustably mounted in the brackets 38 as may be seen from Fig. 5. The ends of guides 37 are flared outwardly, as shown in Fig. 2, to facilitate the entrance and centering of a tray as it moves into position along conveyor 2 over arms 32.

The can-receiving member 29 likewise comprises a pair of arms secured together by a shaft. The arms are shown at 40, preferably T-shaped, and are bolted at 41 (Fig. 3) to bracket members 42 which are keyed and clamped to a hollow shaft 43 which is sleeved onto the central portion of shaft 30.

Figure 6:
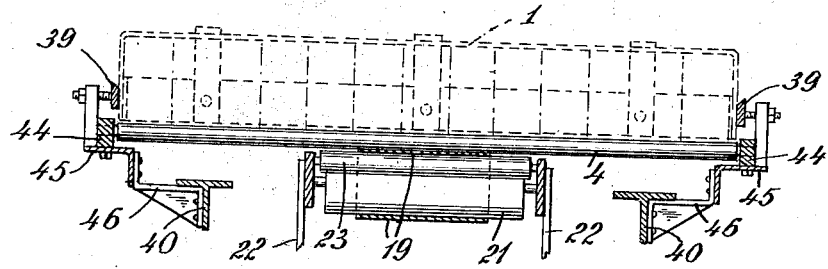
Fig. 6 is a similar section of the discharge side of the apparatus showing the cans inverted and the tray resting on top of them.

Can-receiving member 29, in addition to the two arms 40, also comprises the roller conveyor section 4 which consists of a closely spaced series of rollers journaled in side members 44 which are positioned at a greater spacing than arms 40, as shown in Fig. 6, since the rollers 4 must extend the full width of the cans in the tray. Members 44 are bolted to angle members 45 and these angle members are in turn secured each by a pair of brackets 46 to arms 40.

The two members, that is, the tray-supporting frame 28 and the can-receiving member 29, are operated from the previously described unfolded position to the folded position and back again to the unfolded position by mechanism now to be described, the primary member of which is a crank shaft 47 and two cranks 48 and 49, one on each end of this shaft. Crank 48, through a connecting rod 50 and a crank pin 51, operates the tray-supporting frame. Crank 49, through connecting rod 52 and crank pin 53, operates the can-receiving member 29. It will be understood that one complete revolution of crank shaft 47 actuates the tray-supporting frame 48 and can-receiving member 29 to the folded position shown in Fig. 3 and indicated by the dot-and-dash line in Fig. 1, and then returns them to their original unfolded position in alinement with the two conveyors. In other words, one complete revolution of shaft 47 brings about a complete inverting operation of a tray of cans. It will be understood from the relative location of shaft 30, the connecting rods and cranks and considering the direction of rotation of the crank shaft, that during the first part of the downward movement of can-receiving member 29 it will move faster than member 28.

The entire mechanism is at least partially balanced so as to require a minimum of turning effort in its operation by means of counterweights 54 which are secured to steel cables 55 which pass over pulleys or sheaves 56 mounted in fixed position at any convenient height above the apparatus. The opposite ends of cables 55 are secured to can-receiving member 29 at 57. The counterweights 54 each consist of a plurality of sectional weights which may be added or taken away so as to enable the machine to be adjusted to handle loaded trays of different weights.

In the course of an inverting operation, as the tray is tilted upwardly by the arms 32 of the tray-supporting frame 28, the tray slides toward the hinge axis of the inverting apparatus, that is to say, toward shaft 30. In order to hold the end of the tray clear of the bracket members 34, a pair of stop plates 58 is provided (Fig. 3) these being bolted to the face of the T-shaped arms 32 as shown in Fig. 3. After the tray-inverting members 28 and 29 reach the folded position of Fig. 3 and then swing outwardly again away from one another, the tray 1 and its load of cans being now carried on the can-receiving member 29, the weight of the cans and tray during the early part of this unfolding movement is supported by a centrally located stop plate 59 which is bolted to suitable brackets secured to the arms 40 of can-receiving member 29.

From a consideration of the connections afforded between tray-supporting frame 28 and can-receiving member 29 by the connecting rods 50, 52 and the cranks 48 and 49, on crankshaft 47, it will be understood that counterweights 54 counterbalance the weight of members 28 and 29 and the tray of cans in its upward movement from conveyor 2 to the folded position of Fig. 3 as well as in its downward movement from the position of Fig. 3 to its completely inverted position in alignment with conveyor 5. In other words, the apparatus is balanced from the beginning to the end of a tray-inverting operation. Hence only a small amount of power is needed for its operation and consequently the driving motor 60 is of small size.

Figure 7:
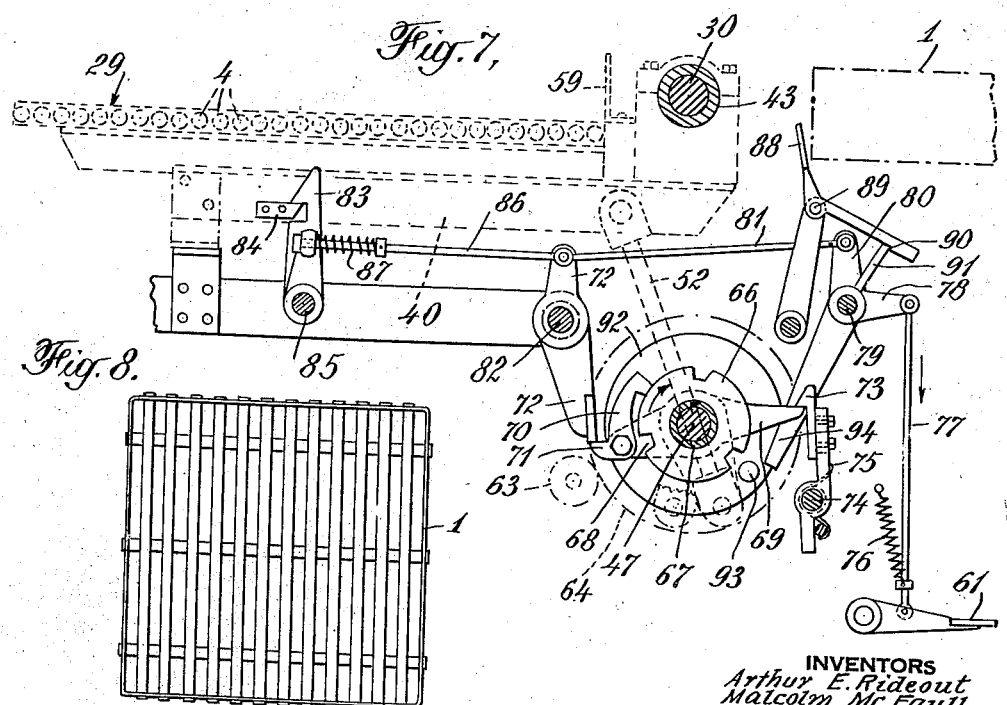
Fig. 7 is a longitudinal vertical section showing the control mechanism of the apparatus in a different position from Fig. 3.

The driving connections between motor 60 and the crank shaft 47 together with the mechanism by which the rotation of the crank shaft is controlled, are illustrated particularly in Figs. 3, 4 and 7. This mechanism is so arranged that when it is desired to invert a tray of cans, one of the operators steps on a treadle 61 pivoted on one side of the machine, and if a tray has been properly positioned on conveyor 2 with respect to the tray-supporting frame 28, the operator will be permitted to depress treadle 61 and this will cause the apparatus to operate to perform a complete inverting operation and then stop, regardless of whether or not the operator continues to leave his foot on the treadle. The next inverting operation cannot be performed until a succeeding tray has been received and properly positioned in the apparatus. This, however, will ordinarily take place automatically promptly upon the completion of the inverting operation so that by again depressing treadle 61 the inverting of the next tray can be started immediately.

Referring now to Fig. 3, motor 60 is connected to a reduction gearing 62, and a pinion 63 on the slow speed shaft of this gearing meshes with a gear 64 which is mounted to turn freely on shaft 47 and is connected thereto through a one-revolution clutch indicated generally by numeral 65. This one-revolution clutch includes a notched wheel 66 mounted on shaft 47 alongside of gear 64 and fixed to this gear so as to rotate with it. It will be understood that gear 64 and notched wheel 66 operate continuously.

Keyed to shaft 47 adjacent notched wheel 66 there is a driven clutch member 67 which has two opposite arms 68 and 69, the former carrying a dog 70 and the latter serving as a stop arm. In Fig. 7 the control mechanism parts are shown in normal position corresponding to the open, unfolded or alined position of the tray-inverting members 28 and 29. In this position the tail 71 of dog 70 is engaged by the end of a latching arm 72 which holds the tooth of dog 70 out of engagement with the notches of continuously rotating wheel 66. Also in this position the end of stop arm 69 is engaged by a catch 73 which is pivotally mounted on a short shaft 74 and biased by means of a helical spring 75 into engagement with the stop arm.

Pressure on treadle 61 stretches a helical spring 76 and through a link 77 connected to an arm 78 actuates a rock shaft 79 extending crosswise of the machine. Pinned to this shaft near its center there is an arm 80 connected by a link 81 to latching arm 72 above its pivot point which is on a cross rod 82. Hence depressing treadle 61 rocks latching arm 72 in a direction to release the tail 71 of dog 70.

This causes the tooth of dog 70 to engage one of the notches of wheel 66, thereby clutching driven member 67 to this wheel and causing shaft 47 to turn in the direction of the arrows shown in Fig. 7. Cranks 48 and 49 therefore commence to move the tray-inverting members 28 and 29 carrying these members to the closed position of Fig. 3 during approximately the first half-revolution of the cranks, and during the second half-revolution returning the members 28 and 29 to their original positions.

As soon as the one-revolution clutch is engaged the operator removes his foot from treadle 61 and latching arm 72 is returned to the angular position shown in Fig. 7 in the path of the tail 71 of dog 70. Hence shaft 47 will continue to turn through only one revolution or until tail 71 re-engages the end of latching member 72. This causes dog 70 to turn on its pivot and to withdraw its tooth from the notched wheel 66. As this same instant, latch 73 engages the rear of stop arm 69 so as to prevent backward movement of shaft 67 which might result in a slight lifting of inverting members 28 and 29.

If it is desired, the can-receiving member 29 can itself be independently latched in the horizontal or open position by means of a latch finger 83 which engages a block 84 on one of the arms 40. Latch finger 83 is pivoted at 85 to the machine frame and is released by means of a link 86 pivotally connected to link 81 so that latch finger 83 will be released when treadle 61 is depressed. Latch finger 83 is connected to link 86 by means of a yielding connection indicated by helical spring 87 so as to permit the latch to snap into engagement with block 84 when member 29 descends.

In order to prevent the operator from causing the commencement of an inverting operation until a tray of cans is in proper position with respect to the tray-supporting frame 28, a latching device to restrain the movement of treadle 61 is arranged. This comprises a latch member 88 which is pivoted at 89 on a stationary bracket secured to the machine frame and which is positioned to be engaged and actuated by the front end of the tray 1 just as it engages the stop plates 58. The rocking of latch member 88 in this manner causes a tooth 90 at its lower end to be lifted out of engagement with an arm 91 which is pinned to rock shaft 79. This releases shaft 79 so that it can be rocked by treadle 61.

Should the inverting members 28 and 29 at the end of an inverting movement immediately rise again for the next inverting movement as, for example, by the uninterrupted rotation of shaft 47 and cranks 48 and 49 caused by the failure of the operator to remove his foot from treadle 61, the succeeding tray of cans might not be in proper position with respect to the tray-supporting frame 28. This would be apt to result in the upsetting of the tray and probable damage by denting or breakage to a considerable number of cans. In order to obviate such an occurrence the control mechanism provides for the disengagement of the one-revolution clutch 65 at the end of each revolution regardless of whether or not the operator keeps his foot on treadle 61.

This safety device comprises a disk 92 which is fixed to shaft 47 and which has a roller 93 projecting from one side. This roller engages an arm 94 which is pinned to rock shaft 79 and moves this shaft in a direction to shift latching arm 72 back to its normal position in the path of the tail 71 of dog 70. Roller 93 is placed on disk 92 in the proper angular position to actuate arm 94 just before the end of a complete revolution of shaft 47.

It will be understood from Figs. 1, 2 and 3 that at the end of each inverting movement of members 28 and 29, the rollers 4 on which the cans rest during approximately the latter half of the inverting movement are converted from merely a roller supporting table to serve as a live roller conveyor by the engagement of the lower sides of rollers 4 with the upper surface of the right-hand portion of belt 19 which actuates the live roller conveyor 5. Hence at the same instant that the inverted tray 1 and the cans beneath it come into alinement with conveyor 5, they commence to move forward this conveyor and toward the converging disk 6. There is ample time, however, before the cans reach the converging guides 7 and 8 for the lifting off of the tray by the operators.

By means of the present invention there has been provided a can tray inverting apparatus which is not only of rugged construction and will withstand years of service with little attention, but also the apparatus is convenient and easy to operate. Because of the balanced arrangement of its parts it operates smoothly and with small power consumption.

It will be understood that the scope of the invention is not confined to the embodiment illustrated in the drawings and described above but that considerable changes can be made not only in the details of construction but in the arrangement of the hinged tray-supporting frame and can-receiving member inserted in the conveyor line to the converging disk and arranged to be hinged together and folded either to parallel relationship or to an unfolded position where the members are in alinement with one another and with the conveyor, and that such changes can be made without departing from the spirit of the invention, the scope of which is set forth in the appended claims. It will be further understood that the term "cans" as used throughout this specification and in the claims is employed in an inclusive sense rather than in a limited sense and is therefore intended to include articles which can conveniently be handled after the manner described.

We claim:

1. In an apparatus for inverting can trays, a tray-supporting member and a can-receiving member hinged together along adjacent margins in such a way as to permit them to be folded into parallel relation to enclose a loaded tray between them and adapted to be unfolded substantially into alinement with one another, means for swingably supporting said members, mechanism mechanically connecting said members to cause them to swing simultaneously toward or away from one another on said supporting means, and counterbalancing means operatively connected to one of said members and operating through said mechanism to counterbalance the other of said members whereby both members are balanced both during their opening and closing movements.

2. In an apparatus for inverting can trays, a tray-supporting member and a can-receiving member hinged together along adjacent margins in such a way as to permit them to be folded into parallel relation to enclose a loaded tray between them and adapted to be unfolded substantially into alinement with one another, means for swingably supporting said members, a crank shaft, a pair of cranks fixed to said shaft each operatively connected with one of said members to cause said members to swing simultaneously toward or away from one another on said supporting means, and counterbalancing means operatively connected to one of said members and operating through said crank shaft to counterbalance the other of said members whereby both members are balanced during both their opening and closing movements.

3. In an apparatus for inverting can trays, a tray-supporting member and a can-receiving member hinged together along adjacent margins in such a way as to permit them to be folded into parallel relation to enclose a loaded tray between them and adapted to be unfolded substantially into alinement with one another, means for swingably supporting said members, a crank shaft, a pair of cranks fixed to said shaft each operatively connected with one of said members to cause said members to swing simultaneously toward or away from one another, power-operated means for rotating said crank shaft, control means therefor releasable to cause said shaft to rotate and to interrupt the rotation thereof at the completion of an inverting movement of the tray-supporting and can-receiving members, manually operated means for releasing said control means, and a latch normally preventing the actuation of said releasing means and adapted to be actuated by the tray to be inverted when the tray is properly positioned with respect to the tray-supporting member.

4. In an apparatus for inverting can trays, a tray supporting frame and a can-receiving roller table member hinged together along adjacent margins in such a way as to permit them to be folded into parallel and tilted position to enclose a loaded tray between them and adapted to be unfolded substantially to horizontal position in alinement with one another, means for swingably supporting said members, the swinging of said members to folded and tilted position causing the transfer of the cans and tray to the can-receiving member and the return of said members to said horizontal position completing the inverting of said cans and tray, and power-operated means for rotating the rollers of said roller table when the can-receiving member reaches said horizontal position so as to cause the inverted cans and tray to be discharged therefrom.

5. In an apparatus for inverting can trays, a tray supporting frame and a can-receiving roller table member hinged together along adjacent margins in such a way as to permit them to be folded into parallel and tilted position to enclose a loaded tray between them and adapted to be unfolded substantially to horizontal position in alinement with one another, means for swingably supporting said members, the swinging of said members to folded and slightly tilted position causing the transfer of the cans and tray to the can-receiving member and the return of said members to said horizontal position completing the inverting of said cans and tray, and a continuously driven substantially horizontal belt adapted to be frictionally engaged by he rollers of said roller table member when the can-receiving member reaches said horizontal position so as to cause the inverted cans and tray to be discharged therefrom.

6. In an apparatus for handling articles, a tray-supporting frame member and an article-receiving table member hinged together along adjacent margins in such a way as to permit them to be folded into parallel and tilted position to enclose a loaded tray between them and adapted to be unfolded substantially to horizontal position in alinement with one another, means for swingably supporting said members, the swinging of said members to folded and tilted position causing the transfer of the articles and tray to the article-receiving table and the return of said members to said horizontal position completing an inverting of said articles and tray, rollers on said table member upon which the inverted articles may rest, a series of rollers journaled in fixed bearings in continuation of the table member rollers when the latter are in said substantially horizontal position, and power-operated means for rotating the rollers when the table member reaches said position so as to cause the inverted articles and tray to be conveyed along the rollers.

7. In an apparatus for handling articles, a tray-supporting frame member and an article-receiving table member hinged together along adjacent margins in such a way as to permit them to be folded into parallel and tilted position to enclose a loaded tray between them and adapted to be unfolded substantially to horizontal position in alinement with one another, means for swingably supporting said members, the swinging of said members to folded and tilted position causing the transfer of the articles and tray to the article-receiving table and the return of said members to said horizontal position completing an inverting of said articles and tray, rollers on said table member upon which the inverted articles may rest, a belt adapted to be frictionally engaged by the rollers of said roller table member when said member reaches said substantially horizontal position, a series of rollers journaled in fixed bearings and also adapted to be engaged by said belt and in continuation of the table member rollers when the latter engage the belt, and means for driving the belt to rotate the rollers to convey the articles along the rollers.

8. In an apparatus for inverting can trays, a tray-supporting member and a can-receiving member, said members being pivotally mounted along adjacent margins about a common axis offset from the receiving surfaces of both of said members so that said members may be swung from an initially alined position towards one another into parallel spaced relation to enclose and partially invert a loaded tray and the can-receiving member may be returned to its initial position to complete the inversion of such loaded tray, and means independent of the hinge between the members for supporting said members as they swing about the hinged axis, the can-receiving member comprising side members and a series of closely spaced transfer rollers mounted for free rotation in said side members on axes extending generally parallel to the axis about which said members hinge, said rollers extending substantially the entire width of the can-receiving member and being adapted to receive cans from the tray-supporting member and assist in the removal of cans from the receiving member, after said members have been swung into alinement with one another.

9. In a system for handling articles, a pair of hingeably connected platforms, means for mounting the platforms for movement between extended and parallel positions for transferring articles on one of the platforms to inverted positions on the other platform, rollers on the last mentioned platform upon which the inverted articles may rest, and a belt engageable with the rollers when the last mentioned platform is in extended position for driving said rollers.

10. In a system for handling articles, a pair of hingeably connected platforms, means for mounting the platforms for movement between extended and parallel positions for transferring articles on one of the platforms to inverted positions on the other platform, rollers on the last mentioned platform upon which the inverted articles may rest, a belt engaging platform rollers when the platform is in extended position, a series of rollers journaled on fixed bearings and also engaging the belt and in continuation of the platform rollers when the latter engage the belt, and means for moving the belt to turn the rollers to convey the articles along the rollers.

ARTHUR E. RIDEOUT.
MALCOLM McFAULL.
LUDWIG WIMMER.

CERTIFICATE OF CORRECTION.

Patent No. 2,365,007. December 12, 1944.

ARTHUR E RIDEOUT, ET AL.

It is hereby certified that error appears in the printed specification of the above numbered patent requiring correction as follows: Page 4, second column, line 33, after the word "forward" insert --toward--; page 5, second column, line 11, claim 5, for "he" read --the--; and that the said Letters Patent should be read with this correction therein that the same may conform to the record of the case in the Patent Office.

Signed and sealed this 27th day of March, A. D. 1945.

Leslie Frazer (Seal) Acting Commissioner of Patents.